April 18, 1939.   W. LINTERN ET AL   2,155,018
VEHICLE BODY VENTILATION
Original Filed Jan. 20, 1933
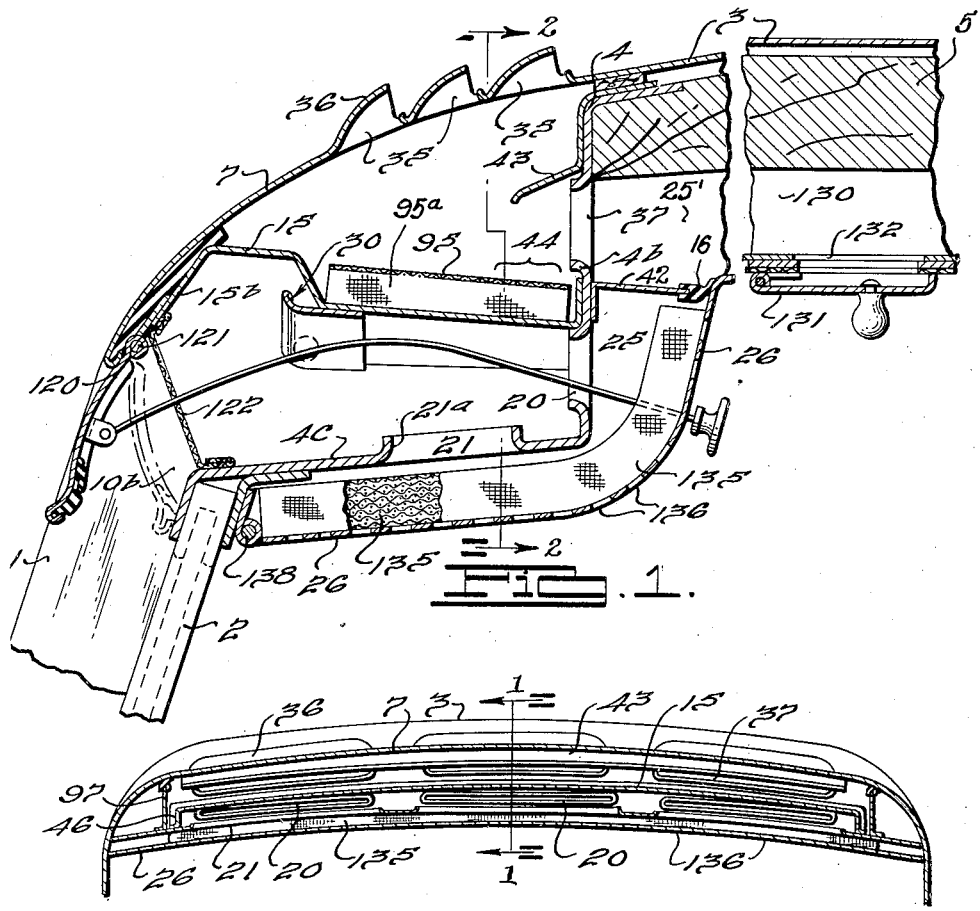
INVENTORS.
William Lintern,
Alfred R. Lintern.
BY Harness, Dickey, Pierce & Hann
ATTORNEYS.

UNITED STATES PATENT OFFICE 2,155,018

VEHICLE BODY VENTILATION

William Lintern, Cleveland, Ohio, and Alfred R. Lintern, Detroit, Mich., assignors to Evans Products Company, Detroit, Mich., a corporation of Delaware Application April 6, 1936, Serial No. 72,986, which is a division of application Serial No. 652,624, January 20, 1933. Divided and this application November 27, 1936, Serial No. 112,978

1 Claim. (Cl. 98—2)

This invention relates to a vehicle body ventilating apparatus of the type disclosed and claimed in the patent to William Lintern 1,862,058 issued June 7, 1932, and the type disclosed and claimed in the patent to William Lintern and Alfred R. Lintern 1,969,934, issued August 14, 1934, and is a division of the co-pending application of William Lintern and Alfred R. Lintern, Serial No. 72,986, filed April 6, 1936, which in turn is a division of the patent to William Lintern and Alfred R. Lintern No. 2,036,485, issued April 7, 1936.

Objects of the invention are to simplify and reduce the cost of construction and installation of an efficient all weather injector and/or ejector ventilator apparatus for vehicle bodies particularly of the closed type; to provide a ventilating unit for a vehicle body which may be more economically installed, particularly as a built-in feature of the body; to provide various practical arrangements for cleaning air received into a vehicle body in comparatively large volume; to provide an air injecting apparatus for vehicle bodies of the closed type including air cleaning means and more specifically air cleaning means so arranged as not to reduce the volume of air supplied to the interior of a vehicle body below a point affording complete comfort to the occupants of said body; to provide for controlling the function of air cleaning media in an air injector for vehicle bodies in such manner that the cleaning medium may be rendered inactive as desired to at times increase the volume of air supplied to the body; to provide for reducing wind noise in an injector ventilator for a vehicle body; and to provide an air injector by which adequate air for full aeration of the body space is supplied without unpleasant and deleterious drafts.

Other objects of the invention will become apparent from the following specification, the drawing relating thereto and from the claim hereinafter set forth.

In the drawing in which like numerals are used to designate like parts in the several views throughout;

Figure 1 is a fragmentary sectional view taken longitudinally of the vehicle body and showing the upper and forward portion on the plane indicated by the line I—I of Fig. 2;

Fig. 2 is a sectional view taken transversely of the vehicle body and substantially along the line 2—2 of Fig. 1.

Referring to the drawing, I indicates a portion of the body front wall which forms the upright outer windshield frame. These are the usual forward vehicle body side frame posts. The windshield 2 is shown in position between the posts I. The roof or top wall structure of the body is shown generally at 3, and joining the roof structure and the front wall framework, there is a hollow header structure including a header member 4 adapted to be made from pressed steel. The header member 4 connects a transverse header member 5 with the front frame posts I in conventional fashion. The header member 4 has a substantially vertical portion 4b and a substantially horizontal portion 4c. The ends of the header may curve downwardly at the body sides and may be suitably rigidly secured to the side posts.

Connecting the front wall structure with the roof structure 3 and forming an outer wall of the hollow header there is an outer header member 7. This it is to be understood is referred to automobile body building as the top roof panel. The panel 7 overhangs the upper margin of the windshield and extends rearwardly over the windshield and the rearwardly extending portion has air inlet passages communicating the interior of the hollow header with the outside air, there being three of these openings in the present embodiment. The inner surface of the top roof panel 7 defines portions of both air injector and air ejector ducts.

The upper wall of the injector duct is formed by a sheet metal member 15, which divides the injector duct from the ejector duct portions of the header structure. This member 15 will be hereinafter referred to as a divider. The divider may be secured by a flange to the vertical portion of the header member 4, and is provided at its forward edge with a depending flange 15b.

At the vertical and horizontally disposed portions of the header are air passage openings 20 and 21, preferably strengthened by flanging the metal inwardly continuously about each opening. These openings as shown are arranged in common vertical planes longitudinally of the vehicle body so that part of the air received into the duct above described is diverted rearwardly through the header 4 and part forced downwardly therethrough. Air from the openings 20 and 21 flows into a space 25 provided between the header and a front header panel 26.

To eject the vitiated air from the interior of the passenger compartment as set forth in the above identified Lintern patents, the air under high pressure rising from the windshield and the front wall of the body generally, including the forwardly facing portion of the top roof panel 7, creates an exceeedingly low air pressure area behind the effective upper limit of the front wall. Thus the mere provision of suitable openings in the forward portion of the top wall and suitable air ducts through the body space provide an excellent air ejector to maintain circulation of air in the body in conjunction with the injector above described and to rapidly absorb foul air from the body. Such suitable ejector openings are shown at 35 in the top roof panel, and these are preferably guarded by decorative louvres 36. The louvres guard the ejector duct against receiving larger pieces of foreign matter from the air. The assistance rendered by the louvres in the air ejecting action is inconsiderable as experience has demonstrated that the openings without louvres appear to be more effective in ejecting air in large volumes.

The lower wall of the ejector duct is formed by the divider 15, and ejector openings communicating with said duct are provided in the header as illustrated at 37. The space between the front header panel and the header member 4 is divided by a suitable wall member 42. The wall 42 is co-extensive with the panel and may be secured to the rear side of the header 4. The unattached edge may be sealed against the front header panel as by rubber strips 16.

A suitable continuous water shed formation 43 is preferably provided above the openings 37 to carry water which may enter the ejector openings entirely clear of the openings 37.

It is to be understood that the ejector duct may be continued any suitable distance rearwardly of the car body in order that air may be discharged from the body at any desired point. For example suitable individually controlled branch ducts may be disposed within the rear structure to communicate with the space 25′ of the ejector duct.

A trough arrangement 30 is disposed within the injector duct transversely thereof and fixed to the underside of the divider 15. The trough arrangement discharges near the side portions of the body top structure, and the ends of the trough are inclined downwardly to discharge through the end walls into the drain ducts 46.

A refinement of the ejector includes the provision of a splash screen 95 shown as an inverted channel of suitable metal screen with vertical portions 95a resting on the divider 15 thus holding the main body of the screen in spaced relation to the divider. During storms a considerable volume of water may be received through the ejector opening 35 and such water will be prevented from splashing through the ejector opening 37 in the header member 4 by being caught by the screening.

Water collected in the ejector duct forwardly of the header member 4 is conveyed laterally of the vehicle body in the cross duct 44 and this discharges into the downwardly extending drain ducts 46 at the side of the body.

Means are provided which are particularly adapted for diffusing the injected air so as to substantially eliminate all unpleasant draft which might be present with all the injector control doors or shutters open at the same time. The control doors or shutters 120, one being shown, are mounted exteriorly of the injector openings 10b. As shown, these doors 120 are hinged at 121 to a descending flange portion 15b of the divider 15 and the doors swung into spaced relation to the windshield frame work as shown in full lines to provide for positively deflecting large quantities of air into the injector duct. Suitable guarding screening may be positioned over the injector opening at 122.

An ejector duct 130 in the ceiling of the car is shown diagrammatically. It may be understood that this duct may extend any desirable distance along the ceiling and that the duct may either be built into the ceiling structure or formed separately therefrom on the inside of the body. A suitable control for such duct may comprise adjustable doors 131 positioned to close and adjustably regulate suitable openings 132 in the duct. Assuming several of such doors, the air may be ejected from the body at a number of points with relation to the body space generally, as may be desired.

The air cleaning and draft diffusing device comprises as shown a reticulated air diffusing body 135 of substantial thickness. This may comprise loosely laminated screens lying within the space 25 between the front header panel 26 and the header member 4. The front header panel 26 may be perforated or otherwise provided with a suitable arrangement of openings as at 136 to allow air received by the injector and passed through the diffusing body to enter the interior of the vehicle body.

To facilitate positioning of the air diffusing body 135, the front header panel may be hinged as at 138 adjacent the upper windshield frame and at its upper edge this panel may be secured in any suitable fashion as by screws, to the inner wall surface of the ejector duct 130.

Formal changes may be made in the specific embodiment of the invention described without departing from the spirit and substance of the broad invention, the scope of which is commensurate with the appended claim.

What we claim is:

In a vehicle body having a front wall and top wall, a hollow header structure including a transverse header member rigidly joined to both said walls, means co-operating therewith to provide an injector inlet passage and injector duct, said duct including an opening through said header member to conduct the injected air toward the interior of the body, a front header panel within the body and disposed in spaced relation to said header member, an opening through said front header panel, and a reticulated air diffusing body of substantial thickness disposed between said header member and front header panel.

WILLIAM LINTERN.
ALFRED R. LINTERN.